United States Patent
Kuhlmann et al.

(10) Patent No.: US 7,649,323 B1
(45) Date of Patent: Jan. 19, 2010

(54) RECHARGEABLE LIGHT-EMITTING DIODE DRIVER CIRCUIT

(75) Inventors: Kurt Kuhlmann, San Jose, CA (US); David M. Allen, Blachly, OR (US)

(73) Assignee: Laughing Rabbit, Inc., Blachly, OR (US)

(*) Notice: Subject to any disclaimer, the term of this patent is extended or adjusted under 35 U.S.C. 154(b) by 354 days.

(21) Appl. No.: 11/897,824

(22) Filed: Aug. 31, 2007

(51) Int. Cl.
*H05B 37/00* (2006.01)
(52) U.S. Cl. .................. 315/200 A; 315/291; 315/307
(58) Field of Classification Search ............ 315/200 A, 315/86, 160, 209 R, 291, 307, 362; 362/157, 362/183, 184, 186, 200, 208
See application file for complete search history.

(56) References Cited

U.S. PATENT DOCUMENTS

| | | | |
|---|---|---|---|
| 5,793,184 A * | 8/1998 | O'Connor | 320/101 |
| 6,296,367 B1 * | 10/2001 | Parsons et al. | 362/183 |
| 6,457,840 B2 | 10/2002 | Maglica et al. | 362/183 |
| 6,563,269 B2 * | 5/2003 | Robinett et al. | 315/86 |
| 7,015,654 B1 | 3/2006 | Kuhlmann | 315/291 |
| 7,394,211 B1 * | 7/2008 | Kuhlmann | 315/291 |
| 7,466,082 B1 * | 12/2008 | Snyder et al. | 315/200 A |
| 7,557,536 B2 * | 7/2009 | Lobert et al. | 320/114 |

* cited by examiner

*Primary Examiner*—Thuy Vinh Tran
(74) *Attorney, Agent, or Firm*—Black Lowe & Graham PLLC

(57) ABSTRACT

A self-contained, rechargeable LED flashlight uses a zener diode in reverse-breakdown avalanche mode as a low-cost voltage regulator. A second embodiment of the LED flashlight incorporates boost-buck circuitry to allow the internal rechargeable flashlight battery to be recharged through external dry cells. An LED or LED array of the flashlight may be by passed with operator control to allow an internal battery to operate an external device, such as a cellular telephone or the like.

18 Claims, 7 Drawing Sheets

RECHARGEABLE LIGHT-EMITTING DIODE DRIVER CIRCUIT

TECHNICAL FIELD

The invention generally relates to portable illumination devices. More specifically, the invention relates to personal, handheld flashlights having a self-contained direct-current power supply and one or more light-emitting diodes as a light source.

BACKGROUND OF THE INVENTION

Technology relating to handheld flashlights incorporating a direct-current power supply in the form of replaceable batteries and low-voltage, incandescent bulbs achieved a technological plateau in the 1970s. Advances in the state of the art typically related to methods of packaging the batteries and bulbs, and reflector designs. In particular, the capabilities of flashlights of this type are strictly limited by inherent characteristics of the incandescent bulb itself. Initially, evacuated bulbs using tungsten filaments enabled power supplies in the range of 1.3V (and more when such batteries are connected in series) to provide varying levels of illumination. So-called halogen bulbs permitted higher filament temperatures, increasing the output of such flashlights. Nevertheless, the inherent inefficiency of incandescent bulbs limited the duration of operation of such flashlights to a matter of a few hours or less, depending on the number of dry cells provided in the power supply. That is, for increased run time the batteries could be connected in parallel. For increased light intensity the batteries could be connected in series (for increased voltage) but at the expense of run time. In addition, filament bulbs are highly susceptible to mechanical shock, breaking the filament and rendering the flashlight inoperative. In addition, substantial development effort was directed to switch mechanisms for intermittently connecting the direct current power supply to the incandescent bulb so as to render either a more reliable or inexpensive switch, or both.

U.S. Pat. No. 4,242,724 to Stone is believed to be representative of one evolutionary branch of such technology relating to the packaging of a disposable floating flashlight in which the outer casing of the light itself forms a part of the switch mechanism that, when squeezed, completes electrical continuity between two AA (1.3 V each) batteries and an incandescent bulb. The flashlight is compact, and floats if accidentally dropped into water. U.S. Pat. No. 5,134,558 to Williams et al. discloses a different evolutionary branch in which the voltage output from four AA-type batteries is boosted by an oscillator-driven transformer rectifying circuit to an intermittent high voltage applied to a xenon gas flashtube so as to provide a high-intensity emergency flasher. The device disclosed in Williams et al. delivers significantly more illumination from a direct current power supply than does the incandescent bulb type of flashlight disclosed by Stone. Nevertheless, the circuitry disclosed in Williams et al. for operating the xenon flashtube is expensive, bulky, and only suitable for intermittent operation of the flashtube rather than for providing a constant light output. Thus, the teaching of the prior art disclosed by Williams et al. is not suitable for remedying the inherent limitations of the incandescent bulb type of flashlight technology disclosed by Stone.

As stated above, the fundamental limitations of prior art flashlights are related to inherent limitations of incandescent bulb technology, and inherent limitations of electrical circuits for driving other light-generating devices, such as the xenon flashtube shown by Williams et al. Nevertheless, semiconductor technology contemporarily advanced so as to provide semiconductor devices, including light-emitting diodes (hereinafter occasionally "LEDs") having significantly lower current drain than incandescent bulbs in a highly robust package operable at relatively low direct current voltages. In addition, early LEDs were substantially more power efficient than incandescent bulbs having similar current consumption characteristics. Finally, the small physical size of LEDs permitted extremely efficient packaging shapes to be adopted for such lights. U.S. Pat. No. 5,386,351 to Tabor discloses such a space-efficient packaging design for a single LED flashlight. The Tabor patent discloses a two-part, snap-fit housing incorporating a discoid type of battery in which one leg of a two-terminal LED is employed as part of a cantilever spring switch mechanism that, upon depression by a flexible button, completes a direct current circuit to the LED. Unfortunately, such early stage LEDs could not provide significant light output without being driven at very high currents, in which case, the power efficiency of the LED with respect to the quantity of light produced significantly decreased. Also, LEDs in use during the period in which the Tabor patent application was filed were capable of producing light in only the red part of the visible spectrum. These two limitations resulted in an LED flashlight only having utility for intermittent operation or continuous illumination over short distances. Therefore, such personal flashlights could not supplant conventional incandescent bulb flashlights, which have a more linear relationship with respect to supply voltage and current. A high-intensity incandescent bulb flashlight can be produced by merely increasing the amount of current and/or voltage supply to the bulb. Conventional LEDs, being non-linear devices, do not respond in such a linear fashion. Therefore, LEDs were often employed in lighting devices for alternative purposes, such as the color-coded, multiple-LED light and key device shown in U.S. Pat. No. 4,831,504 to Nishizawa et al. The Nishizawa et al. patent discloses a combination LED flashlight and key in which multiple LEDs having different colors are driven by separate, manual switches and/or a microprocessor to signal an appropriate light-detecting and demodulating device in association with a door lock or operating lock. Similarly, international Patent Application No. WO 01/77575 A1 titled, "Portable Illumination Device" published on Oct. 18, 2001, to Allen discloses a unique product package for a single-LED personal flashlight employing a discoid type of battery in which multiple depressions of a switch incorporated into the product housing cycle the single LED through multiple modes according to instructions stored in a microprocessor within the housing. Neither the invention disclosed by Nishizawa et al. nor the invention disclosed by Allen is capable of substantially increasing the light output of the LED such that the lighting devices disclosed therein are adequate replacements for high-intensity incandescent bulb flashlights. The principal reason for this is that light-emitting diodes, being junction semiconductor devices, have a forward bias voltage that is predetermined by the physics of the semiconductor materials from which diodes are manufactured. The forward-biased voltage of silicon-based light-emitting diodes is approximately 3.6 V for aqua, blue, and white LEDs and 1.8 V for red, yellow, and green LEDs. The voltage-current characteristics of devices of this type are such that substantially increasing the applied voltage outside of a range defined by the forward bias voltage does not substantially increase the light output of the device, but merely results in vastly increased current flowing therethrough. The power output of a diode being equivalent to the product of the voltage applied thereto and the current flowing therethrough, higher voltages on the power supply side merely result in much higher current which results in wasted power without significant additional illumination. Thus, the light-emitting diode can basically be characterized as a device having an optimal operating characteristic defined by a substantially constant current at a nearly fixed voltage. Therefore, the only efficient method for substantially increasing light output of a prior art LED device based on the silicon architecture is to provide multiple LEDs in parallel with the direct current voltage supply. Unfortunately, this arrangement only drains the typical (1.2, 1.5, or 3 V) battery supplies quickly until the batteries can no longer supply the forward bias voltage of the diodes. Placing the LEDs in series with the power supply merely exacerbates this problem. Thus, although the direct current power supply may be capable of providing additional current (i.e., the batteries are not fully discharged yet) the partially depleted batteries cannot forward bias and thus illuminate the LEDs.

The semiconductor industry has recently addressed the above limitations of LEDs by providing white light LEDs based on indium-gallium-arsenic-phosphide architecture having forward bias voltages in excess of 3.6 V. LEDs of this type not only provide a white light that is more effective than the red light of the prior art doped-silicon technology, but also produce substantially more light output for a given current. Unfortunately, the battery technology based on a voltage of approximately 1.5 V per dry cell is again limited in that three dry cells in series, having a nominal voltage of 4.5 V, are quickly drained to an actual applied voltage of less than 3.6 V at which point the white light LED becomes inoperative even though the batteries still retain a substantial charge.

U.S. Pat. No. 7,015,654 to Kuhlmann et al., assigned to the assignee of the present invention, addresses the need for an LED driver circuit that conditions all of the available power within the conventional dry cell battery for application to high forward bias voltage LEDs by providing a microcontroller and boost converter circuit providing constant current to a light-emitting diode or diode array. The microcontroller is operatively coupled with a semiconductor switch and the boost converter circuit so as to measure the ability of a DC power supply to charge an inductor of the boost converter circuit. Duty cycles of the semiconductor switch are modified according to measurements so as to supply substantially constant current to the LED or LED array through the inductor, regardless of the actual instantaneous battery voltage. The problem of unused battery charge in LED flashlights having been solved, a challenge remained in making such flashlights rechargeable with the battery(s) in situ.

Rechargeable miniature flashlights are known and one flashlight of this type is described in U.S. Pat. No. 6,457,840, to Maglica et al., issued on Oct. 1, 2002. This rechargeable flashlight is of the incandescent bulb type utilizing conventional, miniature two- or three-cell flashlight batteries. The rechargeable flashlight has an external, tailcap switch that enables an external, conventional charging device to establish a current path to the internal rechargeable batteries. The external charging device uses a conventional voltage regulator to "step down" the power source voltage to the internal battery voltage. The only internal circuitry provided within the flashlight itself is a single diode to reverse block current flow from the internal batteries to external "charge rings 63, 70" (so that they do not) become inadvertently shorted together such as by laying the flashlight down on a metallic surface, in contact with a coin, etc. However, this prior art flashlight is not of the LED type and does not teach how to effectively recharge such a flashlight with internal circuitry and batteries in situ.

Thus, a need exists for a rechargeable light-emitting diode flashlight having self-contained recharging circuitry.

A further need exists for a self-contained, rechargeable light-emitting diode flashlight capable of recharging itself from a low-current power supply.

SUMMARY OF THE INVENTION

It is therefore an object of the present invention to provide a self-contained, rechargeable light-emitting diode flashlight.

It is a further object of the present invention to provide self-contained, rechargeable light-emitting diode flashlight that achieves the above object and which also can be recharged from a low-current power supply.

It is yet another object of the present invention to provide a self-contained, rechargeable light-emitting diode flashlight that achieves the above objects and which also can be recharged from a variety of power supplies.

The invention achieves the above objects, and other objects and advantages that will become apparent from the description that follows, by providing a rechargeable light-emitting device driver circuit usable with a self-contained, rechargeable light-emitting diode flashlight that includes a voltage source, a rechargeable first battery having a nominal battery voltage connected in parallel with the voltage source, and a first nonlinear current-blocking device having a reverse-breakdown voltage greater than the nominal battery voltage and connected in parallel between the voltage source and the first battery for charging the first battery at the nominal battery voltage by the voltage source. A second, nonlinear current-blocking device (e.g., a diode) is connected in series between the first nonlinear current-blocking device and the first battery to prevent discharge of the first battery through the voltage source. Finally, a light-emitting device (e.g., a light-emitting diode) having a forward bias voltage approximately equal to the nominal battery voltage is provided in series with a first switch operably connected to a logical control device. The series connected light-emitting device and first switch are connected in parallel with the first battery so that the first battery can power the light-emitting device, under the control of the logic device, and the voltage source can recharge the first battery.

In preferred embodiments of the invention, the voltage source (e.g., a photovoltaic array) is external to the flashlight and has a current output less than a maximum reverse-bias current rating of the first nonlinear current-blocking device. In an alternate embodiment of the invention, the voltage source is a second battery and the flashlight includes internal power-conditioning means having an inductor in series with a second switch operatively connected to the logic control device for boosting voltage from the second battery above the nominal voltage of the first battery and for recharging the first battery. The invention may include a third bypass switch controlled by the logic device and connected in shunt around the second nonlinear current-blocking device, so that the first battery can power an external device (e.g., a cellphone, fire-starting material, etc.) without powering the light-emitting device.

DETAILED DESCRIPTION OF THE PREFERRED EMBODIMENTS

Figure 1:
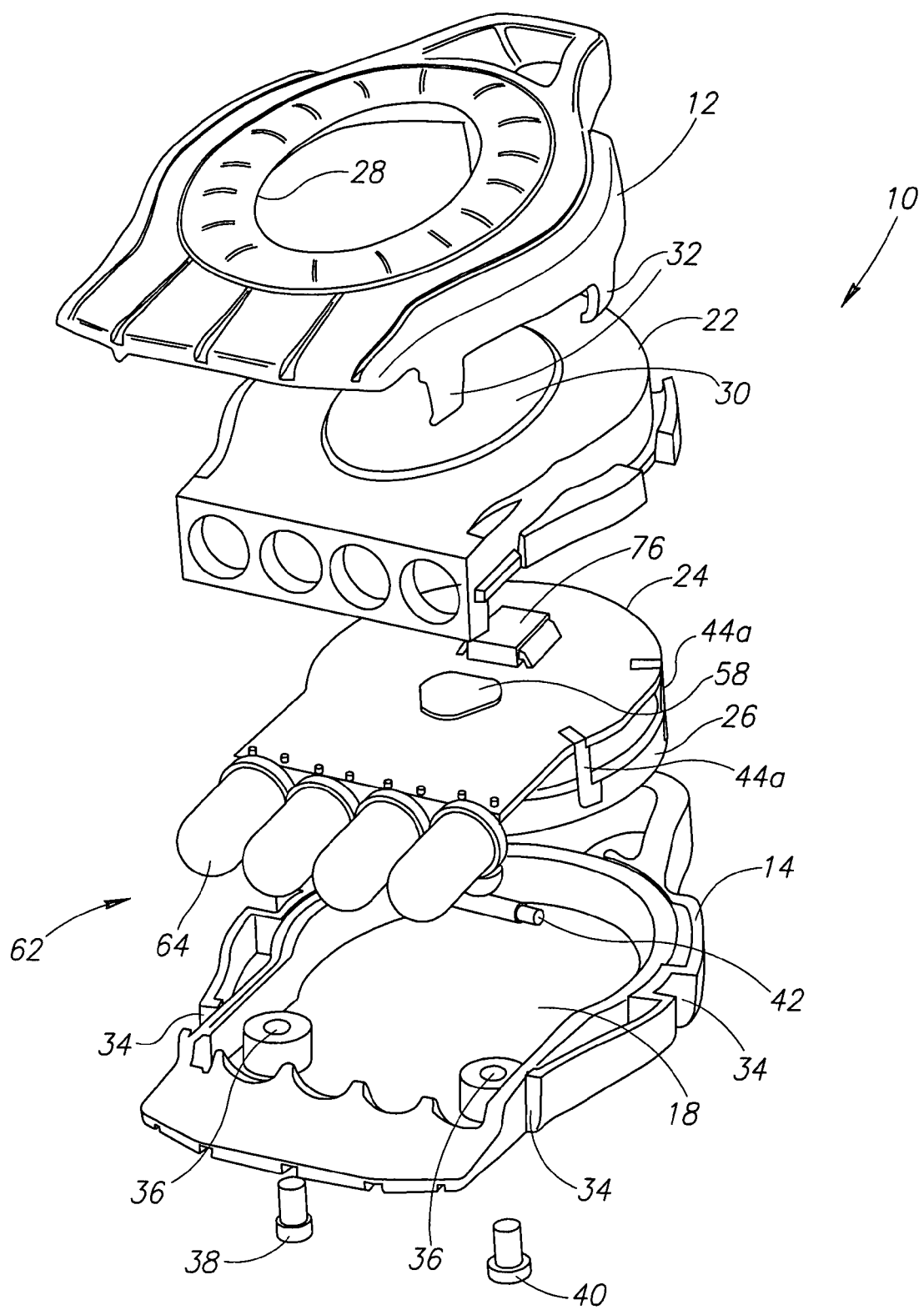
FIG. 1 is an exploded, isometric view a self-contained rechargeable light-emitting diode flashlight employing the general principles of the invention.

A self-contained rechargeable light-emitting diode (hereinafter "LED") flashlight in accordance with the principles of the invention is generally indicated at reference numeral 10 in the various Figures of the attached drawings, wherein like numbered elements in the Figures correspond to like numbered elements herein. The flashlight includes upper and lower housings 12, 14 of the clamshell type, preferably manufactured from a high-impact polymer material such as ABS (acrlybutylstyrene) so as to define an internal chamber 18 suitable for receipt of a urethane button portion 22, a printed circuitboard 24, and a lithium ion coin-cell battery 26. The upper housing 12 defines a central aperture 28 for through-receipt of a deformable dome portion 30 of the urethane button 22. The upper housing also has resilient, downwardly depending legs 32, which engage corresponding receptacles 34 on the lower housing to secure the housings together with the button 22 the printed circuitboard 24, and the lithium ion battery 26 therebetween. The lower housing 14 defines forwardly positioned bores 36 for receipt of a pair of charge lugs 38, 40 that are electrically connected to the printed circuitboard 24 by wires 42. The lithium ion battery 26 is electrically and mechanically connected to the printed circuitboard 24 by positive first battery terminals 44a and a negative first battery terminal 44b, shown in FIG. 2. The conventional, coin-type lithium ion single-cell battery may have a nominal voltage of approximately 3.6 volts DC.

Figure 2:
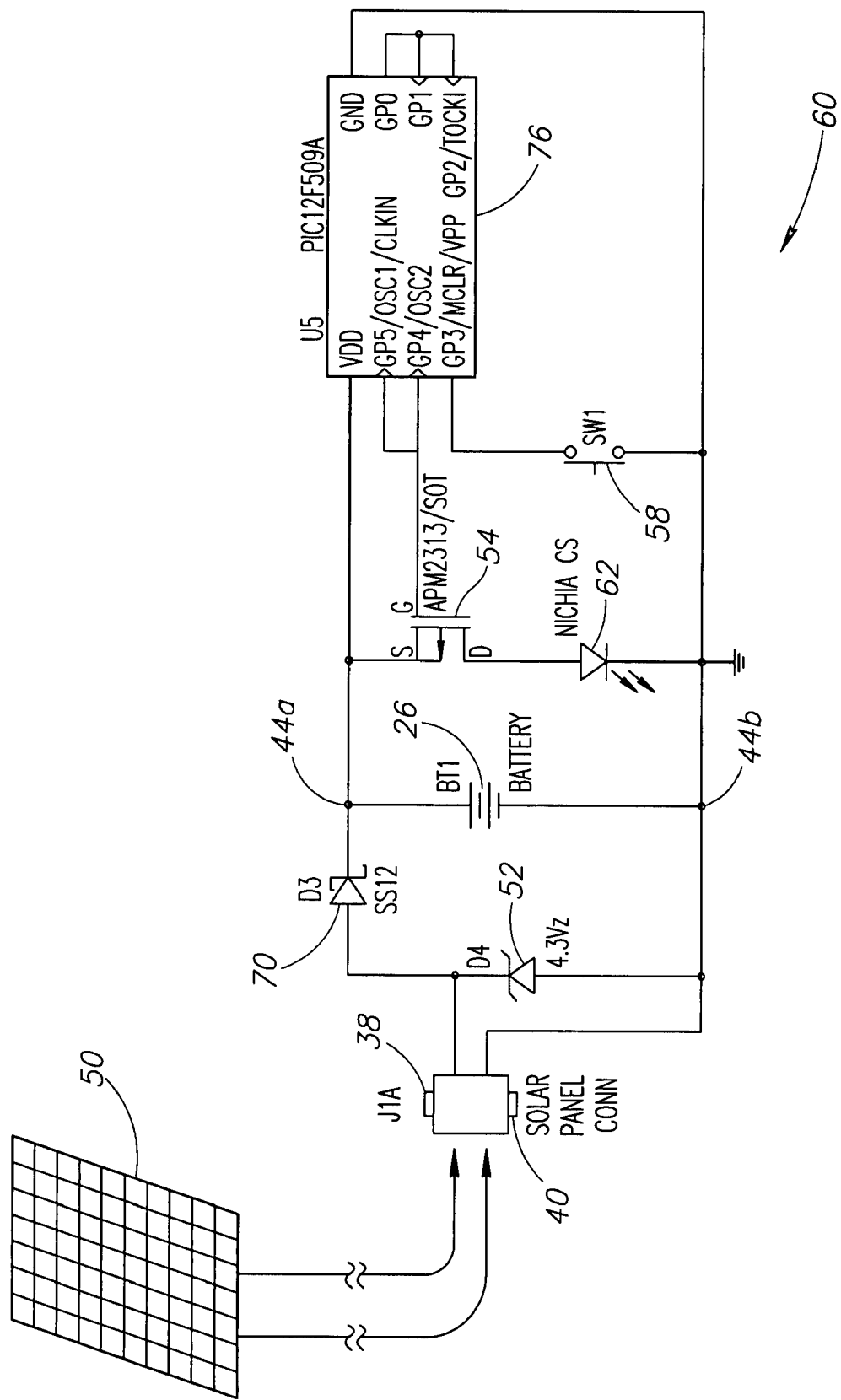
FIG. 2 is an electronic schematic diagram of a rechargeable light-emitting device driver circuit usable with the flashlight shown in FIG. 1.

As best seen in FIG. 2, the charge lugs 38, 40 enable the battery 26 to electrically connect with an external voltage source 50, such as a photovoltaic panel producing a low-current DC output. The invention advantageously uses inherent characteristics of a first nonlinear, current-blocking device 52, such as a Zener diode connected in parallel with the battery 26 and voltage source 50. The Zener diode 52 is selected so as to have a reverse-avalanche breakdown voltage slightly greater (e.g., 4.3 volts) than the nominal battery voltage of the rechargeable first battery 26 (e.g., 3.6 volts) such that the Zener diode 52 acts as a low-cost voltage regulator for recharging the battery. An implicit requirement of the preferred embodiment of the invention is that the voltage source 50 should have a maximum current output no greater than the approximate maximum reverse-breakdown current rating for the Zener diode 52, to avoid damaging the diode. In this respect, the flashlight 10 can be recharged from an external source, such as photovoltaic solar cell panel 50 through self-contained circuitry, in contrast to the prior art devices that typically employ bulky, external charging apparatus. Once the battery 26 has been charged, direct current from the battery is directly routed through a first switch 54 in the form of a P-channel depletion-mode metal oxide semiconductor field-effect transistor (hereinafter "MOSFET" or "FET") to a light-emitting diode (hereinafter "LED") array 62, the series combination of which is connected electrically in parallel with the battery 26. A multifunction single-pole normally open pushbutton switch 58 is operable by depression of the deformable dome portion 30 through the central aperture 28 of the upper housing 12 so as to operate the first switch 54 as part of a light-emitting device drive circuit generally indicated at reference numeral 60. The LED array may comprise a single, or one or more individual LEDs 64. A preferred, single light-emitting diode is manufactured by Nichia having a white light output in a forward bias voltage of 3.6 volts per diode. Thus, the nominal battery voltage and the LED array or LED forward bias voltage are precisely matched in the invention. If an array of LED's are used (eg. two LED's having a forward bias voltage of 1.8 V each) The series voltage drop should be appropriately equal to the nominal battery voltage. A Schottky diode 70 is incorporated into the first embodiment in series between the Zener diode 52 and first battery 26 to prevent the battery from reverse discharging through the voltage source 50. The Schottky diode has a very low forward-bias voltage (approximately 0.1 volt DC) so as to have little effect on the voltage-regulating properties of the Zener diode 52.

The first switch 54 advantageously directly commutates direct current from the battery 26 to the LED array 62 without any dropping resistor through conventional pulsewidth modulation. To this end, the light-emitting device drive circuit 60 is provided with a logic control device 76, preferably in the form of an eight-bit programmable controller manufactured by Microchip, of Chandler, Ariz., USA. An appropriate Model No. PIC12F509A has eight pins numbered in the conventional manner with physical pin number 1 (VDD) being connected to positive first battery terminal 44a and the source of the FET 54. Pin 8 of the logic control device 76 (ground) is connected to the cathode of the LED array 62 or LED 64 and the negative first battery terminal 44b. General purpose pins 4 and 5 of the logic control device 76 are connected to the gate of the first switch 54 so as to control operation of the flashlight through sequential depressions of the multifunction pushbutton switch 58. As will be understood by those of ordinary skill in the art, the microcontroller 76 can be programmed to operate the LED array 62 or LED 64 according to a sequential event program, as described in detail in U.S. Pat. No. 7,015,654, issued on Mar. 21, 2006 to the assignee of the present invention, the disclosure of which is incorporated herein by reference.

Figure 3:
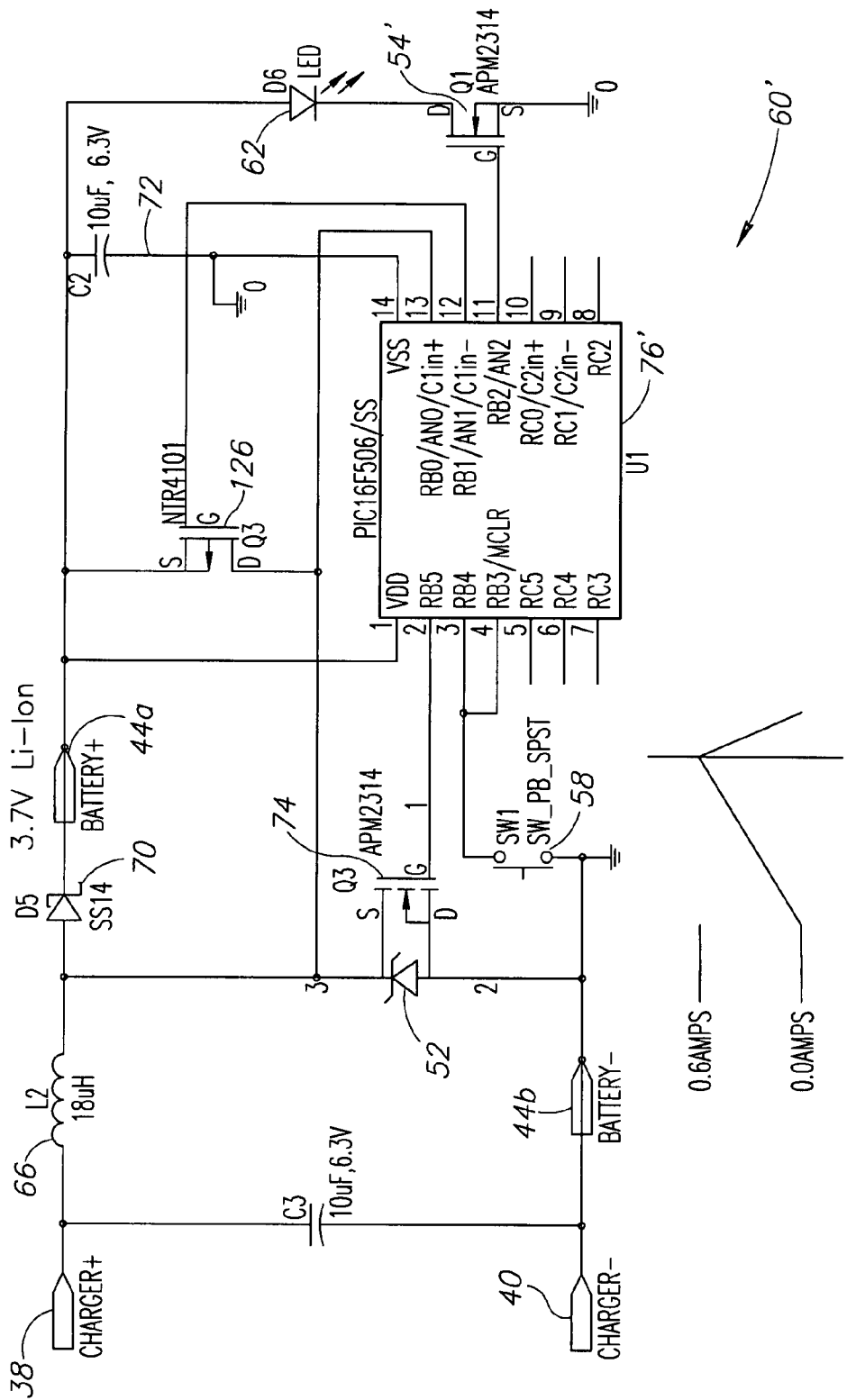
FIG. 3 is a schematic diagram of a second embodiment of the rechargeable light-emitting device driver circuit incorporating boost/buck technology for extracting charge from an external charging battery.
Figure 7:
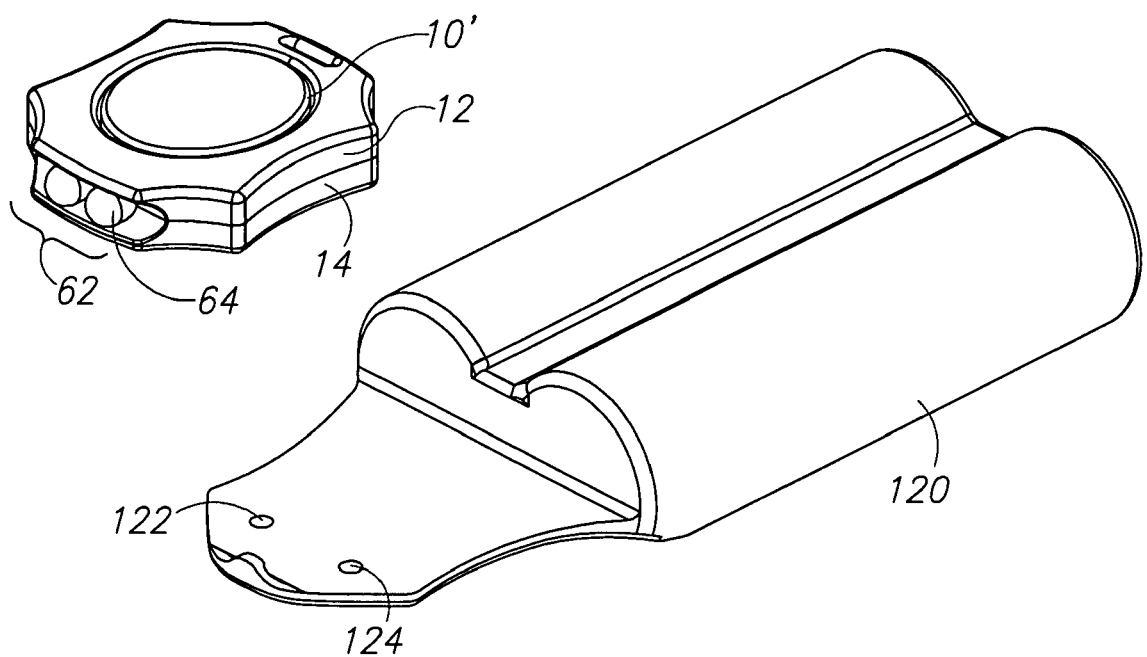
FIG. 7 is an exploded isometric environmental view of a second embodiment of the flashlight in use with an external battery charging/voltage source.

A second embodiment of the invention is generally indicated at reference numeral 60' in FIG. 3. In the second embodiment, like elements with respect to the first embodiment are indicated by the same reference numeral with a prime symbol thereafter. The second embodiment provides the invention with the ability to be recharged from an external second battery compartment 120 shown in FIG. 7 containing a pair of AA, 1.5-volt batteries connected in series (i.e., nominal battery voltage 3.0 volts DC) for commutation to the charge lugs 38, 40 through external output lugs 122, 124. This second embodiment includes boost-buck circuitry described in detail in U.S. Pat. No. 7,015,654 to provide the first battery terminals 44a, 44b with all of the charge available within the AA battery cells and external second battery compartment 120.

Figure 5:
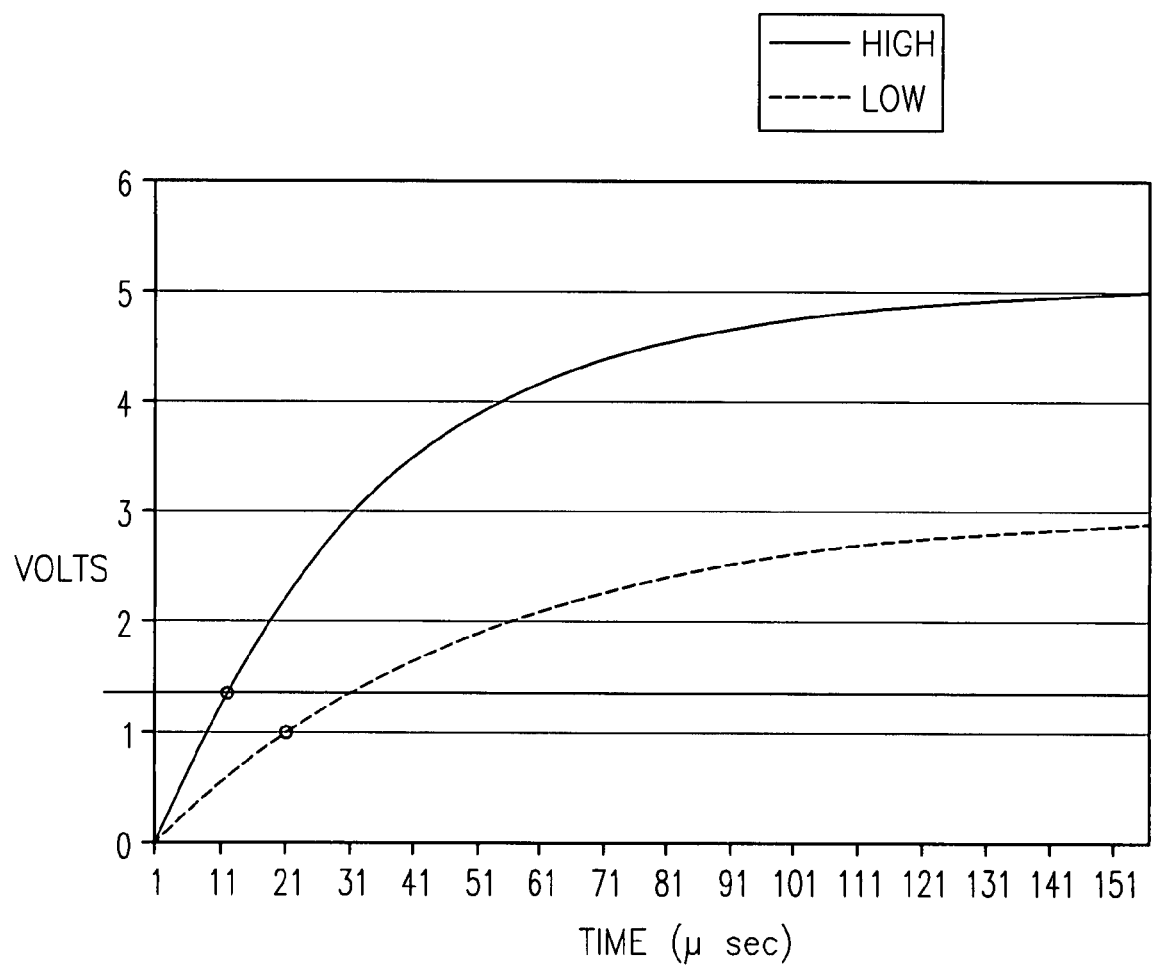
FIG. 5 is a voltage versus time graph for an RC curve of a gate capacitance/microcontroller internal resistance time constant utilized to determine charging time for a boost/buck inductor.

The circuit 60' of the second embodiment includes a light-emitting diode array 62 consisting of a plurality of individual LEDs 64. The preferred light-emitting diode array has a total forward bias voltage of 3.6 V. Thus, the forward bias voltage ($V_{fb}$) of the LED array 62 is approximately equal to the first battery 26 nominal voltage. The power supply within the second battery compartment 12, however, can only supply at best its nominal voltage of 3.0 V. Therefore, circuit 60 includes a conventional boost circuit consisting of a 33 µH inductor 66 rated at 1 A in series with a Schottky diode 70 having a 0.1 V forward bias voltage in parallel with a 2.2 µF smoothing capacitor 72. The LED array 62 is in parallel with the smoothing capacitor in the conventional boost converter circuit configuration. A second switch 74, preferably in the form of an enhancement-mode, n-channel metal oxide semiconductor field-effect transistor (hereinafter "FET") is provided to selectively connect the inductor 66 to ground so as to permit the power supply to charge the inductor when the gate of the FET is energized. The source of the FET 74 is connected to an output of the inductor 66 and the anode of the diode 70. The drain of the FET 74 is connected to the ground 44b. The high side of the inductor 66 is connected to the positive charger 38. The gate of the FET 74 is connected to pin 2 of a logic control device 76 preferably in the form of an eight-bit programmable microcontroller manufactured by Microchip, of Chandler, Ariz., USA. An appropriate model number PIC 16F506 has fourteen pins numbered in the conventional manner. As stated above, the gate of the FET 74 is connected to pin 2 of that microcontroller (pin 5) in the preferred embodiment. Pin 1 is connected to the positive power supply 44a, while pin 14 is connected to ground 44b. Pins 3 and 4 are connected through the multifunction switch 58 to ground. The general purpose pins (physical pins 2-4 and 11-13) of the microcontroller 76 are of the tri-stable type, that is, these pins can be used as outputs (driven at CMOS logical high or low) or can be used as input pins that float like open circuits and can be intermittently connected through internal pull-up resistors to ground the supply voltage so that voltages can be measured at those pins. The invention advantageously employs the multistate characteristic of these pins to turn the FET switch 76 on and off so that the inductor 66 can be alternately charged and discharged, and at certain preselected periods during this charge/discharge cycle convert general purpose pin 5 (physical pin 2) to an input for measuring voltage in an RC timing circuit comprising the natural gate capacitance of the FET switch 74 connected to battery voltage through an internal pull-up resistance of the microcontroller. It is well known to those of ordinary skill in the art that all field-effect transistors (and the base of junction transistors as well) have an inherent capacitance with respect to ground. Gate capacitance is a known and fixed characteristic of the geometry and chemistry of the field-effect transistor that is provided by the manufacturer. In addition, the internal resistance of the microcontroller is also known and supplied by the manufacturer. The microcontroller is also capable of sensing at its general purpose pins when a threshold voltage (typically the CMOS threshold voltage of 1.2 V) is achieved at any of the general purpose pins when those pins are used as inputs. Thus, at an appropriate time the microcontroller 76 applies the power supply voltage from the second battery 120 through its internal resistance to the gate of the FET 74 and then measures the amount of time it takes for the gate capacitance to reach the threshold voltage. The gate capacitance and internal resistance being fixed, this time to threshold voltage is proportional to the ability of the second battery power supply to charge the inductor. Shorter times represent strong batteries. Longer times represent weak batteries. In the preferred embodiment, a time period of 11 µsec represents strong batteries, whereas a measured time of 31 µsec represents weak batteries. Although the RC curve is exponential, the initial part of the curve below 1.2 V is surprisingly linear such that the microcontroller 76 preferably increases the turn-on time of the FET by a proportionate amount to generate a larger magnetic field in the inductor 66 during a charge cycle. In this manner, a substantially constant current can be supplied for the LED array 62 regardless of the actual, instantaneous voltage of the battery supply available at external electrical contacts 44a and 44b. This is the case where even here in the second embodiment, the nominal battery voltage is significantly below the forward bias voltage of the LED array 62. In addition, the received transition time through the preselected threshold voltage of 1.2 volts is measured while the second battery is under load and, thus, is a more accurate representation of the ability of the second battery to energize the inductor 66. FIG. 5 is a graph of voltage versus time for an RC curve of the gate capacitance/microcontroller internal resistance based on high battery power and low battery power illustrating the different transition times to threshold voltage as described above.

Figure 4:
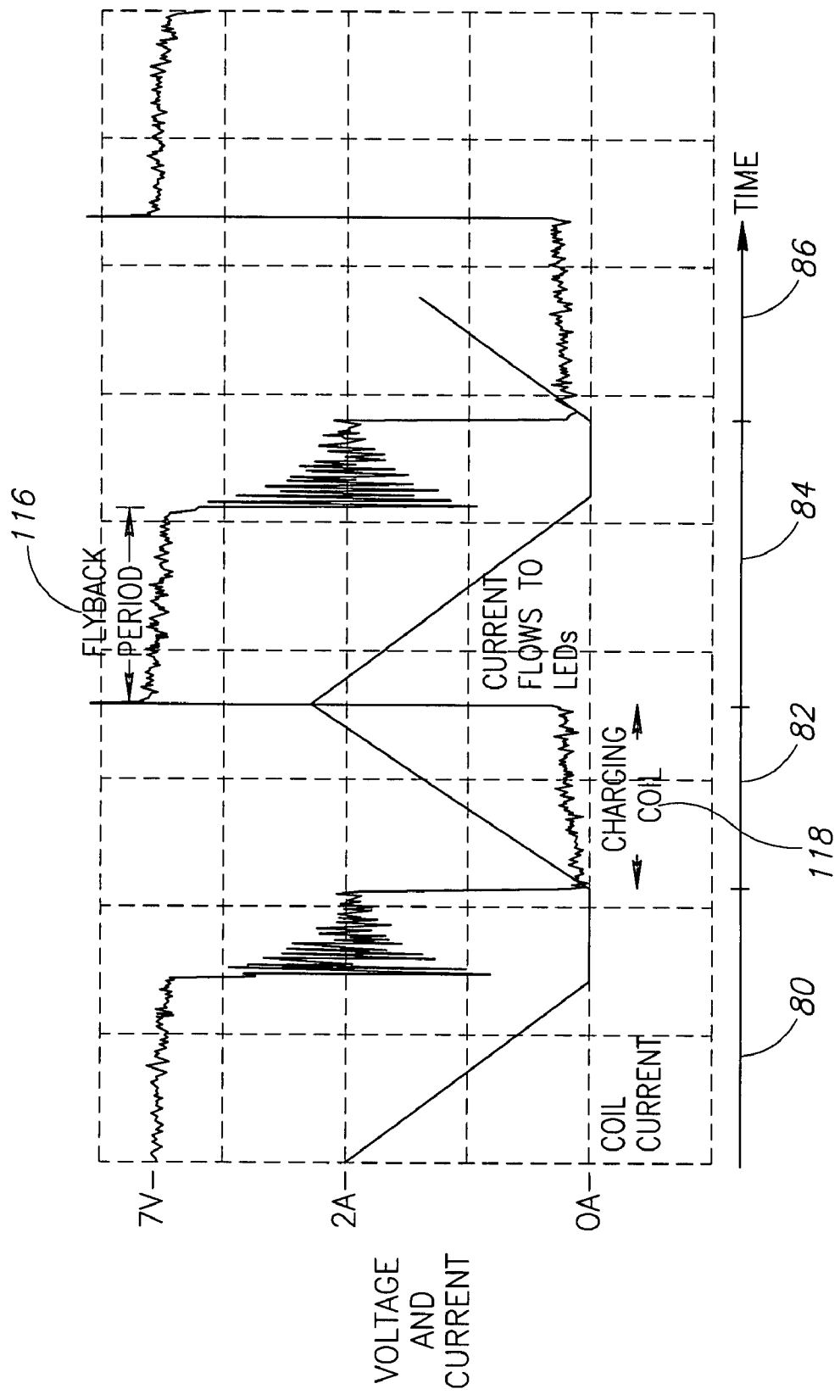
FIG. 4 is a voltage-and-current versus time graph relating to the boost/buck technology shown in FIG. 3.

FIG. 4 graphically represents both the voltage sampled at the drain of the FET first switch 74 and also the current supplied through the blocking diode 70 from the inductor 66. A first discharge cycle 80 is followed by a first charging cycle 82, a subsequent second discharge cycle 84, and a partial third charging cycle 86. In the first discharging cycle 80, the inductor 66 is supplying approximately 2 A through the blocking diode 70 to the smoothing capacitor 72 and LED array 62. The inductor current is represented by a substantially straight triangular and solid line having flat portions at the end of each discharge cycle 80, 84 representing zero current flow. The graph representing the current flow through the blocking diode 70 to the LED array 62 has a substantially constant slope because the rate of change of the current supplied by the inductor with respect to time is proportional to the input voltage (a constant because the battery supplies direct current) provided by the inductance. The inductor voltage (represented by the wavy line in the graph) is substantially more complex because the inductor will supply any voltage necessary to maintain the instantaneous current flow. Thus, as seen in FIG. 4 during the initial discharge cycle 80, the voltage available at the base of the inductor (connected to the drain of the FET first switch 74) remains fairly constant until the current supplied by the inductor drops to approximately zero. At that time, the inductor "rings" about the battery supply voltage (approximately one-half of the previous voltage on the inductor) until the microcontroller 76 turns the first switch FET 74, on which begins charging the inductor during the first charge cycle 82. The inductor voltage remains substantially at zero while the current supplied by the inductor increases linearly to a maximum current of approximately 2 A limited by the length of time which the microcontroller 76 permits the FET first switch 74 to be on. At the end of the first charge cycle 82, the first switch field-effect transistor 74 is turned off (the FET switch opens) permitting the inductor 66 to discharge through the blocking diode 70 to the LED array 62. The inductor voltage at the drain of FET 74 instantaneously jumps to an extremely high value and then remains substantially constant at about 7 volts during what is commonly termed a "flyback period" during second discharge cycle 84. During this so-called "flyback period" the inductor voltage remains substantially constant while the current supply by the inductor linearly decreases toward zero. As the inductor current approaches zero the inductor 66 again begins to "ring" about the battery supply voltage with the amplitude of each excursion exponentially decreasing. During this period of time the inductor current supplied through the blocking diode 70 is again zero until the FET first switch 74 is again turned on by the microcontroller 76 during the third charging cycle 86.

It is to be understood that, although the voltage supplied by the inductor 66 through the blocking diode 70 is essentially a triangular wave having periods during which no current is being supplied the current supplied to the LED array 62 is substantially constant, due to the effect of the smoothing capacitor 72 and blocking diode 70. That is, during a discharge cycle, the capacitor 7 is charged to at least the forward bias voltage of the diode array 62, regardless of the actual battery voltage since the inductor is capable of supplying any voltage necessary to maintain the instantaneous current flow through the blocking diode. That is, the capacitor 72, during any period of time in which the voltage supplied by the inductor 66 is less than the forward bias voltage of the diode array 62, will itself supply current to the diode array. In this second embodiment, with the component values given, the LED array 62 is, in fact, supplied with a substantially constant current of approximately 75 mA. This is very close to an optimal supply of approximately 4 volts at 80 mA for each LED. The LEDs of this preferred embodiment will dim if supplied with voltage less than approximately 3.6 volts and will not operate at maximum efficiency provided with substantially less than 80 mA per LED.

The graph of FIG. 4 covers a time period of approximately 50 microseconds. Thus, the periods in which the inductor 66 is not supplying any substantial current to the LED array 62 is approximately 5 microseconds. It is during these time periods (and once every approximately 3,000 microseconds, approximately 4% of an entire timing sequence) at which time general purpose pin 2 of the microcontroller 76 is switched to a measuring input state and battery voltage is applied through the internal pull-up resistor to the gate of the FET first switch 74 such that the gate capacitor charging time can be measured. The microcontroller 76 then moderates the charging time of the inductor (the first charging cycle 82) from approximately 4 to 9 microseconds such that the desired current is on average supplied to the LED array 62.

Figure 6:
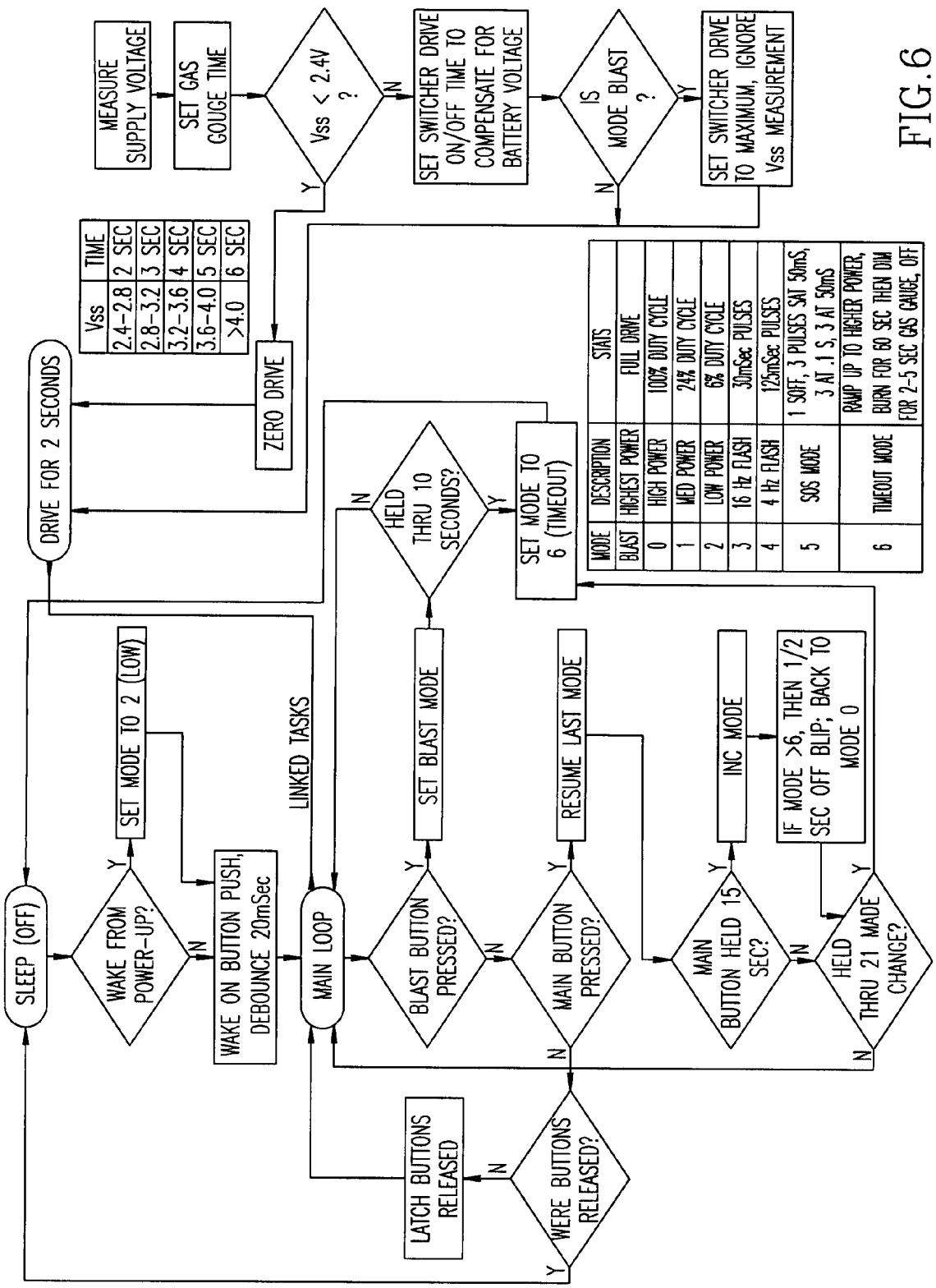
FIG. 6 is a flowchart illustrating a multistate logic diagram for the invention.

Finally, the microcontroller 76, 76 of either embodiment can be programmed to provide a variety of different modes of operation of the LED array 62 as well as to provide information to the user regarding the condition of the battery power supply in the battery compartment 12. FIG. 6 illustrates a logical diagram for a variety of modes that the user may initiate by depressing the multifunction switch 58 multiple times by varying the duty cycle of the first switch 74. In this manner, the LED array 62 may be illuminated with high, medium, or low power, as well as two different flashing modes at different rates. An "SOS" mode can also be achieved. Finally, the right side of FIG. 6 illustrates that the measured charge-up time of the RC time constant established by the base/gate capacitance and internal pull-up resistance of the microcontroller 76' can be associated with a supply voltage. Under one method of the preferred embodiment, the measurement of the supply voltage is associated with an "on" time for the LED array at the end of a high-power illumination cycle (60 seconds) followed by a dimming through medium and low power wherein the low-power setting is maintained in a range of from 2 to 6 seconds until the LED array 62 is finally extinguished. The final dim period of two seconds represents low battery power, and a final dim period of 6 seconds represents high battery power. In this manner, the user is apprised of the condition of the power supply.

As shown in FIG. 3, the second embodiment includes an optional third, bypass switch 126 in the form of a P-channel depletion-mode MOSFET having its gate connected to physical pin 12 (RE1) of the logic control device 76', its source connected to positive first battery terminal 44a, and its drain connected to physical pin 13 of the logic control device 76' and the anode of Schottky diode 70. In this way, the operator can instruct the flashlight 10' to operate an external device connected to the charge lugs 38, 40 by way of multifunction switch 58, bypassing the first switch 54' and LED array 62. The external device may be in the form of a cellphone, firestarter, or the like. The logic control device 76, 76' may also be programmed to "blink" the LED array 62 to indicate changing status and also to dump excess current from the second battery 120 should an over current condition be detected which might other wise damage the Zener disk 52.

Those of ordinary skill in the art will conceive of other alternate embodiments of the invention upon reviewing this disclosure. Thus, the invention is not to be limited to the above description, but is to be determined in scope by the claims that follow.

We claim:

1. A rechargeable light-emitting device driver circuit, comprising:
   a voltage source;
   a rechargeable first battery having a nominal battery voltage connected in parallel with the voltage source;
   a first nonlinear current-blocking device having a reverse-breakdown voltage greater than the nominal battery voltage connected in parallel between the voltage source and the first battery for charging the first battery at the nominal battery voltage by the voltage source;
   a second nonlinear current-blocking device connected in series between the first nonlinear current blocking device and the first battery to prevent discharge of the first battery through the voltage source; and,
   a light-emitting device having a forward bias voltage approximately equal to the nominal battery voltage in series with a first switch operatively connected to logic means for controlling the first switch, the light-emitting device and first switch connected in parallel with the first battery whereby the first battery can power the light-emitting device under control of the logic means and the voltage source can recharge the first battery.

2. The circuit of claim 1, wherein the voltage source has a current output less than a maximum reverse-bias current rating of the first nonlinear current-blocking device.

3. The circuit of claim 2, wherein the voltage source is a photovoltaic panel.

4. The circuit of claim 1, wherein the voltage source is a second battery connected power conditioning means having an inductor in series with a second switch operatively connected to the logic means for boosting voltage from the second battery above the nominal voltage of the first battery for recharging the first battery.

5. The circuit of claim 4, further including a third bypass switch controlled by the logic means and connected in shunt around the second nonlinear current blocking device so that the first battery can power an external device without powering the light-emitting device.

6. The circuit of claim 1, further including a bypass switch connected in shunt around the second nonlinear current-blocking device and to the logic means so that the first battery can power an external device without powering the light-emitting device.

7. The circuit of claim 1, wherein the light-emitting device is a light-emitting diode having a forward bias voltage approximately equal to the nominal battery voltage.

8. The circuit of claim 1, wherein the logic means is a programmable microcontroller.

9. The circuit of claim 1, wherein the second current-blocking device is a Schottky diode.

10. The circuit of claim 1, wherein the first current blocking device is a zener diode.

11. A rechargeable light-emitting diode flashlight driver circuit, comprising:
   a low-current voltage source;
   a rechargeable first battery having a nominal battery voltage connected in parallel with the voltage source;
   a Zener diode having a reverse-breakdown voltage greater than the nominal battery voltage connected in parallel between the voltage source and the first battery for limiting voltage applied to the first battery by the voltage source;
   a Schottky diode connected in series between the zener diode and the first battery to prevent discharge of the first battery through the voltage source; and,
   a light-emitting diode having a forward bias voltage approximately equal to the nominal battery voltage connected in series with a first switch, the first switch operatively connected to logic means for controlling the first switch, the light-emitting diode and first switch connected in parallel with the first battery whereby the first battery can power the light-emitting diode under control of the logic means and the voltage source can recharge the first battery.

12. The circuit of claim 11, wherein the voltage source has a current output less than a maximum reverse-bias current rating of the zener diode.

13. The circuit of claim 12, wherein the voltage source is a photovoltaic panel.

14. The circuit of claim 11, wherein the voltage source is a second battery connected to power-conditioning means having an inductor in series with a second switch operatively connected to the logic means for boosting voltage from the second battery above the nominal voltage of the first battery for recharging the first battery when the second battery is approaching charge depletion.

15. The circuit of claim 14, further including a third bypass switch controlled by the logic means and connected in shunt around the Schottky diode so that the first battery can power an external device without powering the light-emitting device.

16. The circuit of claim 11, further including a bypass switch connected in shunt around the Schottky diode and to the logic means so that the first battery can power an external device without powering the light-emitting device.

17. The circuit of claim 11, wherein the light-emitting diode has a forward bias voltage approximately equal to the nominal battery voltage.

18. The circuit of claim 11, wherein the logic device is a programmable microcontroller.

* * * * *